Feb. 25, 1930. A. M. ALEXANDRESCU 1,748,820
GEAR
Original Filed Dec. 17, 1927   2 Sheets-Sheet 1
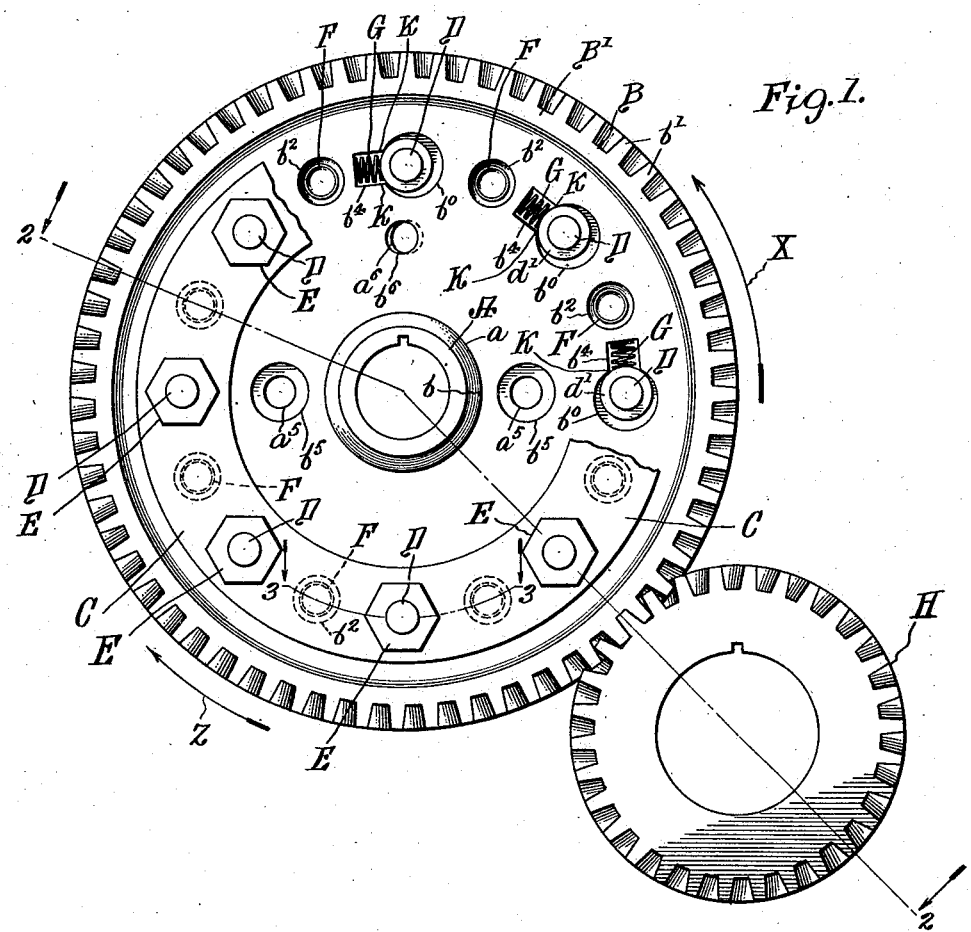
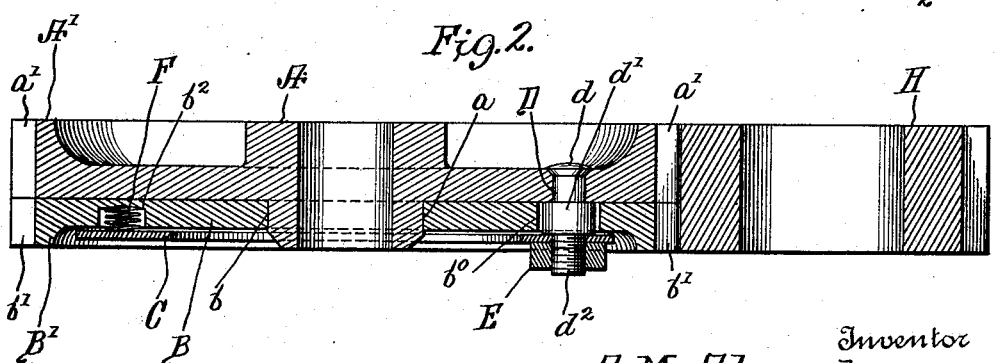
Inventor
A. M. Alexandrescu
by Wilkinson & Giusta
Attorneys.

Feb. 25, 1930.  A. M. ALEXANDRESCU  1,748,820
GEAR
Original Filed Dec. 17, 1927   2 Sheets-Sheet 2

Inventor
A. M. Alexandrescu
by
Wilkinson & Giusta
Attorneys.

Patented Feb. 25, 1930

1,748,820

UNITED STATES PATENT OFFICE

ALEXANDER M. ALEXANDRESCU, OF CLEVELAND, OHIO

GEAR

Application filed December 17, 1927, Serial No. 240,764. Renewed January 9, 1930.

My present invention relates to improvements in adjustable gears, and it is intended to provide a gear whose teeth will automatically adjust themselves to compensate for wear, and to also prevent noise and to prolong the life of the gear. The invention comprises a compound gear composed of two connected toothed disks, one of which is adjustable to the other, and, after once being adjusted, they adapt themselves to a driving or other gear meshing therewith, as will be hereinafter described.

My invention is intended to provide a modification of the apparatus illustrated and described in my application filed November 16, 1927, Serial No. 232,692, and entitled Improvements in gears; and also provide a modification of my apparatus, shown in my copending application 240,763, filed Dec. 17, 1927, also entitled "Improvement in gears," which has matured into Patent 1,746,178.

My invention will be more fully understood after reference to the accompanying drawings in which like parts are indicated by similar reference symbols throughout the several views, and in which, Figure 1 is a side elevation of the compound gear and driving gear meshed therewith, parts being broken away.

Figure 2 shows a section along the broken line 2—2 of Figure 1, looking in the direction of the arrows.

A represents the body portion of the compound gear, whose periphery is flanged as at A', and provided with teeth $a'$. This body portion is also provided with a shoulder $a$ on its hub.

B represents an annular disk flanged on its periphery as at B', and provided with teeth $b'$ cut with the same pitch as the teeth $a'$. The inner wall of this disk B slips freely over the shoulder $a$.

C represents an annular plate or ring, which is mounted concentric with the disks A and B, and these parts A, B and C are connected together by the bolts D, which bolts are firmly secured at one end in the disk A, as by swaging, or by screw connections, or otherwise.

In Figure 2, I have shown the heads of these bolts D swaged into the disk A. These bolts are preferably provided with cylindrical bosses $d'$, which pass freely through the holes $b^0$ provided in the disk B. These holes $b^0$ are of larger diameter than the bosses $d'$, so as to permit the angular adjustment hereinafter described. The plate C is clamped against the outer faces of these bosses $d'$ by means of the nuts E. Suitable washers may be provided for these nuts, if desired.

Figure 3:
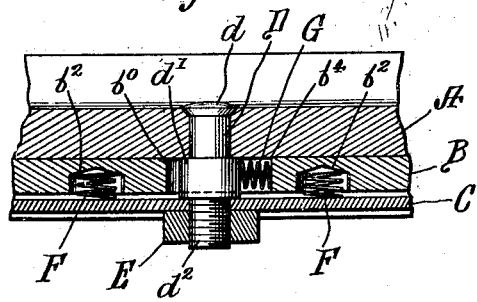
Figure 3 shows a section along the curved line 3—3 of Figure 1, looking in the direction of the arrows.
Figure 5:
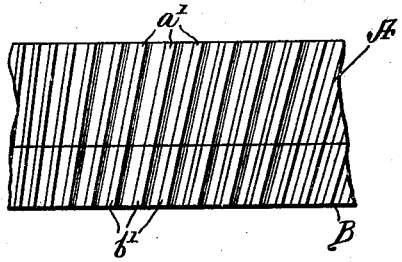
Figure 5 is a fragmentary plan view showing the initial alignment of the teeth of the compound gear.

In order to hold the disks A and B in frictional engagement, I provide a series of stout springs F mounted in sockets $b^2$ of the disk B, and interposed between said disk B and ring C, as shown in Figures 2 and 3.

These springs F will force the disk B back against the disk A, but will permit angular movement between the two disks as tangential pressure is applied.

Figure 4:
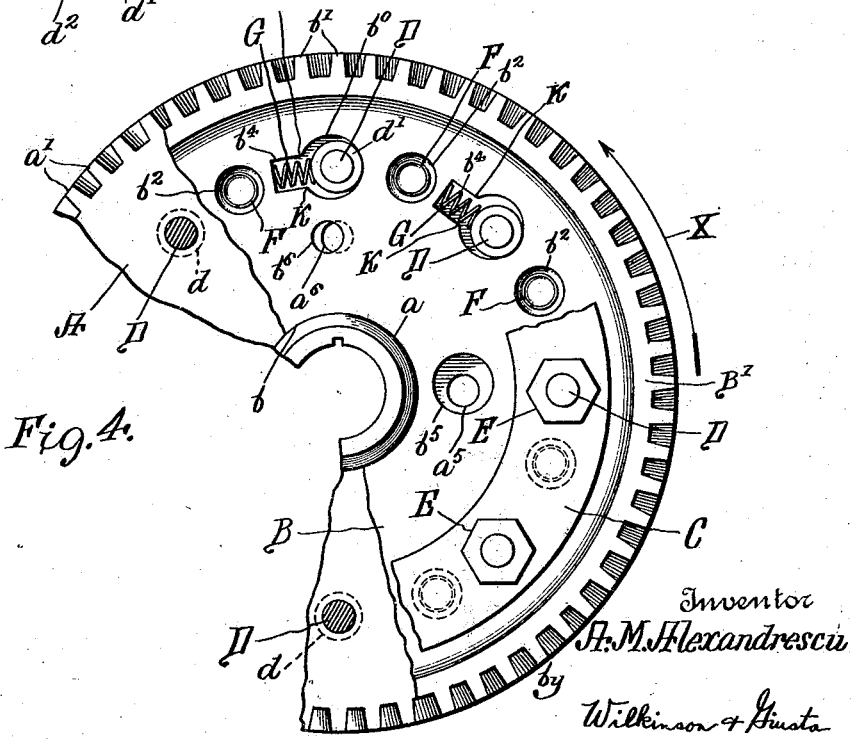
Figure 4 is a fragmentary view showing a side elevation of the compound gear with the adjustment in full advanced position, parts being broken away.

In order to supply such tangential pressure, I provide a series of springs G mounted in chambers $b^4$ of the disk B, which engage the bosses $d'$ of the bolts D, and thus exert a constant pressure tending to rotate the disk B in one direction, to the left, or as indicated by the arrows X, as shown in Figures 1 and 4. Thus these springs will always tend to force the disk B with the teeth $b'$ in the direction to compensate for the wear of the teeth $a'$, and thus automatic adjustment will be secured.

By having the disks A and B made of softer metal than the driving gear H, see Figure 1, the gear teeth will in a large measure be prevented from getting rough, and excessive noises prevented, and the life of the gears is prolonged.

For this purpose, I prefer to make the driving gear of tempered steel, and the disks B and A of softer material, such as soft steel. By the herein described construction, an extremely nice adjustment between co-acting gear teeth is effected, and lost motion between the gears is largely avoided, with the result that the excessive noise is in a great measure prevented, and the life of the gears is materially prolonged.

For convenience in separating the disks, B and A, or for taking same off the shaft, not shown, when desired, these are provided with holes $a^5$ and $b^5$, respectively, for the insertion of suitable tools.

The two disks are also provided with locking holes $a^6$ and $b^6$, as shown in Figures 1 and 4 for the insertion of a drift pin while cutting the teeth $a'$ and $b'$.

Figure 7:
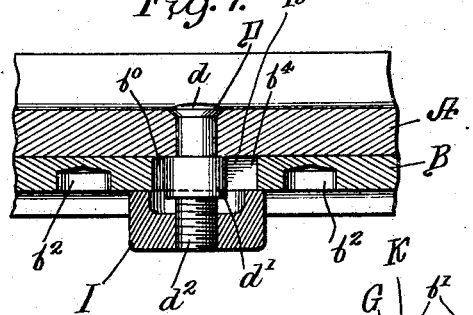
Figure 7 is a section corresponding to that show in Figure 3, and illustrating the mode of assembling the two toothed disks in order to cut the teeth on same.
Figure 6:
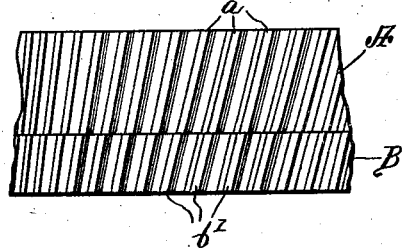
Figure 6 is a similar view to Figure 5, showing the alignment of the teeth after adjustment.

In order to cut the teeth $a'$ and $b'$ simultaneously and accurately in the first instance, I mount the disk B upon the hub $a$ of the disk A in the position shown in Figure 1, then apply the bolts D with their bosses $d'$ resting against the shoulders K provided between the holes $b^0$ and chambers $b^4$. By inserting a short drift pin in the holes $a^6$ and $b^6$, and screwing down on the nuts I provided for the bolts D as shown in Figure 7. the two disks are locked together and in the position to cut teeth.

After the teeth are cut with a back lash of preferably 5/1000 of an inch the nuts I are removed, the springs $b^2$ and $b^4$ are inserted, next the ring C applied so as to engage the threaded ends $d^2$ of the bolts D, and then the nuts E applied and screwed down tight on the bolts D as shown in Figure 1. The parts so assembled are ready for installation in a machine at which time the drift pin is removed from the holes $a^6$ and $b^6$, thus releasing the disk B to automatically adjust itself and be forced to move by the springs G in the direction indicated by the arrow X, shown in Figure 1. This form of gear as illustrated cannot be driven in both directions and is designed to be driven in the one direction indicated by the arrow X.

In case it is desirable to have a gear of this type to be driven in the opposite direction shown by the arrow Z in Figure 1, then the chambers $b^4$ are cut at a point in the holes $b^0$ diametrically opposite to that illustrated.

While I have illustrated and described one embodiment of the invention in its preferred form it will be obvious that various changes might be made in the construction, combination, and arrangement of parts which could be used without departing from the spirit of my invention, and I do not mean to limit the invention to such details except as particularly pointed out in the claims.

Having thus described my invention, what I claim and desire to secure by Letters Patent of the United States is:—

1. A gear of the character described, comprising a main disk flanged at its periphery and provided with gear teeth on said periphery and with a shouldered hub, an annular disk also flanged at its periphery and provided with similar gear teeth, the said second disk being slipped over said hub, bolts secured to the main disk and passing freely through bolt holes in the annular disk, a ring mounted on said bolts, with nuts holding said ring against outward movement, springs under compression interposed between said ring and said annular disk, for holding said disks in frictional engagement, and springs under compression tangentially interposed between said bolts and said annular disk tending to move one disk through an angle relative to the other, substantially as and for the purposes described.

2. A gear of the character described, comprising a main disk flanged at its periphery and provided with gear teeth on said periphery and with a shouldered hub, an annular disk also flanged at its periphery and provided with similar gear teeth, the said second disk being slipped over said hub, the said annular disk being provided with sockets and bolt holes having lateral wing chambers, bolts secured to the main disk and passing freely through said bolt holes in the annular disk, a ring mounted on said bolts, with nuts holding said ring against outward movement, springs under compression mounted in said sockets and interposed between said ring and said annular disk, for holding said disks in frictional engagement, and springs under compression mounted in said wing chambers and tangentially interposed between said bolts and said annular disk tending to move one disk through an angle relative to the other, substantially as and for the purposes described.

3. A gear of the character described, comprising a main disk flanged at its periphery and provided with gear teeth on said periphery and with a shouldered hub, an annular disk also flanged at its periphery and provided with similar gear teeth, the said second disk being slipped over said hub, bolts secured to the main disk and passing freely through bolt holes in the annular disk, a ring mounted on said bolts, with nuts holding said ring against outward movement, springs under compression interposed between said ring and said annular disk, for holding said disks in frictional engagement, and means for automatically moving one disk through a small angle relative to the other, substantially as and for the purposes described.

ALEXANDER M. ALEXANDRESCU.